United States Patent [19]

Stol et al.

[11] 4,076,921

[45] * Feb. 28, 1978

[54] METHOD OF PRODUCING GLYCOL METHACRYLATE OR GLYCOL ACRYLATE POLYMERS AND COPOLYMERS

[75] Inventors: Miroslav Stol; Vladimir Stoy; Zdenek Tuzar, all of Prague, Czechoslovakia

[73] Assignee: Ceskoslovenska akademie ved, Prague, Czechoslovakia

[*] Notice: The portion of the term of this patent subsequent to Oct. 26, 1993, has been disclaimed.

[21] Appl. No.: 297,390

[22] Filed: Oct. 13, 1972

[30] Foreign Application Priority Data

Oct. 14, 1971 Czechoslovakia .................... 7234-71

[51] Int. Cl.² .......................................... C08F 220/20
[52] U.S. Cl. ............................................ 526/89; 3/1; 32/2; 128/82; 351/175; 526/208; 526/209; 526/213; 526/272; 526/264; 526/303; 526/312; 526/317; 526/320

[58] Field of Search .............. 260/86.1 E, 80.81, 78.5, 260/80.72, 80.73, 80.75, 80.76; 526/89, 208, 209, 213, 303, 320, 317, 312, 272, 264

[56] References Cited

U.S. PATENT DOCUMENTS

| | | | |
|---|---|---|---|
| 2,129,722 | 9/1938 | Woodhouse .................... | 260/89.5 R |
| 3,255,135 | 6/1966 | Schmidle ....................... | 260/86.1 R |
| 3,575,946 | 4/1971 | Chromecek et al. ........... | 260/86.1 E |
| 3,699,089 | 10/1972 | Wichterle ........................ | 260/86.1 E |

*Primary Examiner*—Harry Wong, Jr.

[57] ABSTRACT

A starting monomer mixture containing a minor amount of a cross linking agent is precipitation polymerized in a diluent/precipitant which is an unlimited solvent for the starting monomers but is neither a solvent nor a substantial swelling agent for the resultant polymer. The resultant product falling from the polymerization contains soluble and insoluble hydrophilic polymers and copolymers.

10 Claims, 3 Drawing Figures

METHOD OF PRODUCING GLYCOL METHACRYLATE OR GLYCOL ACRYLATE POLYMERS AND COPOLYMERS

This invention relates to a method of producing glycol methacrylate or glycol acrylate polymers or copolymers containing both soluble and insoluble portions.

This application is a companion to our copending application Ser. No. 297,389 now U.S. Pat. No. 3,988,305 issued Oct. 26, 1976 filed on even date hereof, also based on Czech. Application 7234/71, wherein there has been disclosed a method of forming polymer products and copolymer products of a type similar to that of the present invention but containing both soluble and non-soluble portions. Reference to the copending application is made as if more fully set forth for such definitions of terms materials, monomers, cross-linking agents, diluents, solvents, etc., as may be required.

Polymers of the above type are used in any well-known applications and for various purposes. In the form of gels having hydrophilic character and excellent biological compatibility, they have found an important use in medical therapy as prosthetic materials (see Czech. Pat. No. 91918) U.S. Pat. Nos. 2,976,576 and 3,220,960. In some cases they are unsuitable because of their low strength in a water swelled state and it was necessary to find new methods to improve them. Reinforcing materials, such as woven textiles of physiological harmless fibers (e.g. polyethylene glycol tereftalate were used. Gels with various active fillers were also successfully employed; e.g.: colloidal silicon dioxide (Czech. Pat. No. 131,180, and sphere-like glycol methacrylate polymers (Czech. Pat. No. 153,762, U.S. Pat. No. 3,914,431, issued Oct. 21, 1975). The last mentioned filler is closely or substantially cross-linked sphere-like polymer particles with grain sizes of less than $10\gamma n$, and prepared by precipitation polymerization of glycol monomethacrylate in the presence of a major amount of cross-linking glycol dimethacrylate, and an inert diluting agent (Czech. Pat. No. 138,856, U.S. Pat. No. 3,583,957).

In practical utilization of this active filler for preparing reinforced glycol methacrylate gels it is necessary to thicken the monomer mixture to prevent sedimentation of specifically heavier filler particles. For this reason, as a rule, either the pre-polymer having suitable viscosity (preferably of about 200 CP; see Czech. Pat. No. 148,479). or glycol mathecrylate or glycol acrylate polymer that is soluble in the monomer mixture, and which is produced either by the solution polymerization (Czech. Pat. No. 141,101, U.S. Pat. No. 3,575,946) or recently by the precipitating polymerization (Czech. Pat. No. 154,466 U.S. Appl. No. 297,389) was used. Till now, it was necessary to prepare both a polymer filler, and a polymer thickening agent separately by two technologically different manners.

It is the object of the present invention to provide a method for producing glycol methacrylates and glycol acrylate polymers and copolymers having improved properties in a manner which avoids the difficulties and disadvantages of the prior art.

It is an object of the present invention to provide a method in which there is simultaneously formed insoluble and soluble portions or fractions of particulate polymer or copolymer.

It is another object of the present invention to prepare a polymer product in one-step manner of production, which has simultaneously the properties of both a good active filler and good thickening agent.

The method according to the present invention comprises the steps of precipitation polymerization of a monomer mixture of methacrylates or acrylates, their derivatives and mixtures thereof containing a minor amount of a corresponding multi-functional esters as cross-linking agent in a diluent/precipitant which unlimitedly dissolves all components of the starting monomer mixture, but does not dissolve nor act to substantially swell the polymer product thus formed.

The appendant graphs correspond to those given in the copending application, reference to which is made for a detailed explanation of the monomers, materials and polymerization process followed, as well as for an explanation of the symbols employed.

Figure 1:
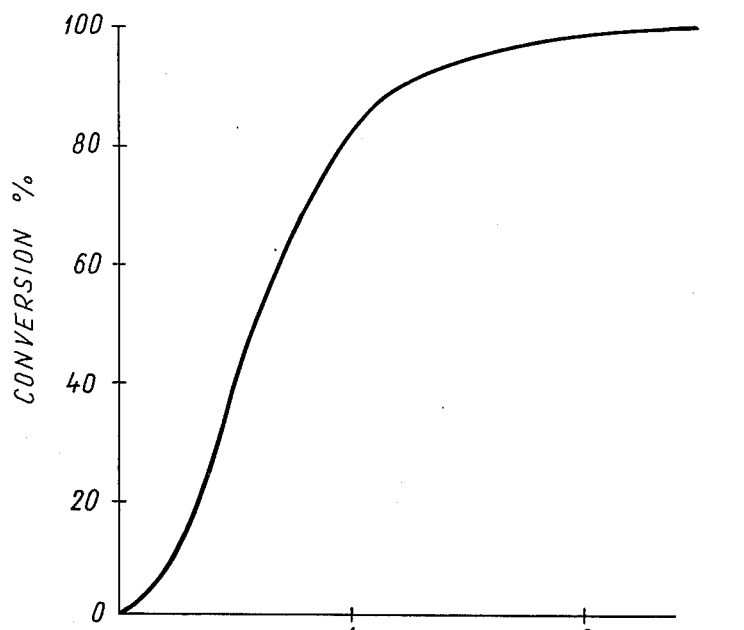
FIG. 1 is a graph showing the percent conversion from monomeric mixture to discrete particulate polymer relative to time under the precipitation polymerization conditions of the present invention.
Figure 2:
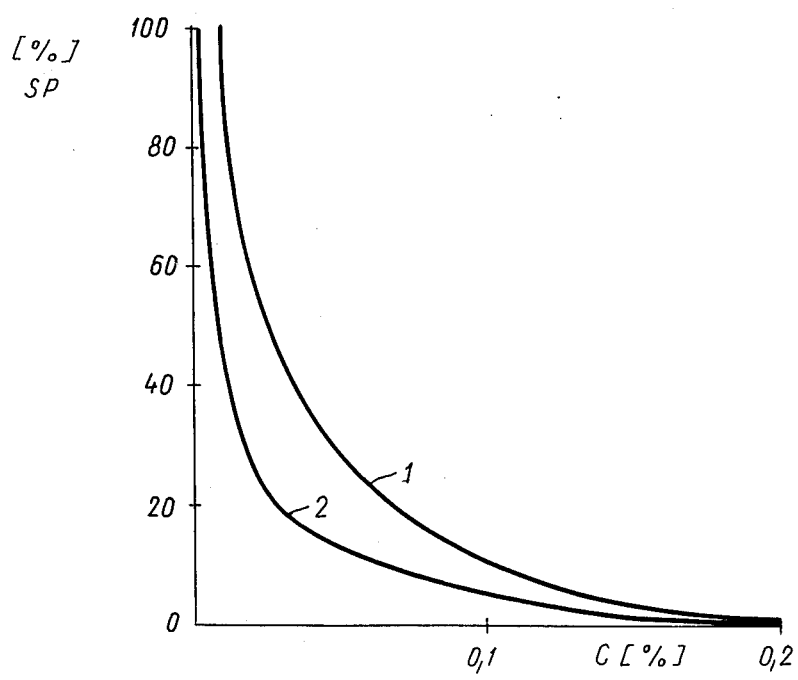
FIG. 2 is a graph showing the effect of the concentration [C] of cross-linking agent with a constant dilution of the polymerization mixture on the portion of the soluble polymer [SP] obtained in the present invention, employing two different dilluting agents.

As seen in FIG. 1, the present invention provides a method for the conversion of a monomer mixture under precipitation polymerization taking 2 to 3 hours to reach substantially the 100 percent level. The polymer products which fall out in a course of the precipitation polymerization take the form of discrete particles of a grain size about 1 $\mu$ which can be easily separated from the diluting-precipitating agent used, e.g. by filtration or centrifugation and subsequently dried into a fine powder. The polymer product produced according to the present invention is only partly soluble in typical conventional solvents of the soluble glycol methacrylate or glycol acrylate polymers, such as lower aliphatic alcohols, dimethyl formamide, and glycol monomethacrylate or glycol acrylate monomers. The quantity of the soluble part depends on the starting concentration of the cross-linking comonomer in the whole monomer mixture (see FIG. 2). The remaining part of the polymer product is formed with slightly cross-linked polymer particles (microgels), which only swell in the above-mentioned solvents, and are then finely dispersed in a polymer solution obtained by dissolving a portion of the soluble part of polymer. The dispersion of the microgels is very fine, and in practice do not form sediment in very thin polymer solutions. It is also stable for long periods of time. It has been found, that the presence of these sporadically cross-linked polymer particles (microgels) in the monomer mixture used to prepare various products of glycol methacrylate gels, greatly improves their mechanical properties (e.g. tensile strength), and acts thus as an active filler. The soluble parts of the polymer act as a good thickening agent for various polymerization mixtures having a base of glycol methacrylates or glycol acrylates.

According to the preferred embodiment of the present invention a starting monomer mixture containing a minor amount of multifold esters of acrylic or methacrylic or methacrylic-acid with a polyhydric aliphatic alcohol is precipitation polymerized under free radical conditions in a diluting-precipitating agent which is an unlimited solvent for all the starting monomers but is neither a solvent or a substantial swelling agent for the resultant polymer product. The concentration of the aforementioned esters may be maintained in a range of from 0.005 to 0.02 to 0.2% by volume based on the total volume of the polymerization mixture. The resultant polymer or copolymer product comprises a mixture of soluble and insoluble parts.

The starting monomers are preferably glycol monomethacrylate, monoacrylates and/or their mixtures and derivatives. As used herein, the word "glycol" not only means the basic ethylene glycol but also polyethylene glycols, such as diethylene glycol, triethylene glycol, and higher polyglycols, further 1,2-propylene glycol, 1,4-butylene glycol, and other poly hydroxy compounds, such as glycerol, pentaerythritol, mannitol, sorbitol, and similar compounds.

As an example of cross-linking agents, or multifold esters, esters having more than univalent alcohol precursors such as ethylene glycol dimethacrylate, triethylene glycol dimethacrylate, glycerol dimethacrylate, glycerol triacrylate can be employed. The amount of the monomer is taken from less than 66% by weight, based on the total polymerization mixture including the diluting agent, if any, up to a feasible low concentration of the monomer, wherein the content of the corresponding cross-linking comonomers are in the range from 0.02 to 0.2% by volume, based on the total volume of the polymerization mixture. Otherwise, either completely soluble or the completely insoluble polymer products are formed, which are not a subject of this invention.

Besides the basic glycol monomethacrylate or monoacrylate monomers, and/or mixtures of these monomers, other comonomers can be used. For practical reasons these can be divided roughly into two groups:

1. Monomers which behave under conditions of the precipitation polymerization according to the present invention in a similar manner as the above-mentioned glycol monomethacrylates or monoacrylates, i.e. they are dissolved completely in the diluting agent used, but their polymers are neither dissolved nor are they swelled in it. Herein are included but not limited, acrylamide, methacrylamide, acrylic acid, methacrylic acid, itaconic acid, citraconic acid, maleic acid, fumaric acid, N-vinyl pyrrollidone, aminoalkyl methacrylate or acrylate, such as 2-aminoethyl methacrylate, N-alkylaminoalkyl methacrylate or acrylate, such as N-methylaminoethyl acrylate, N,N-dialkylaminoalkyl methacrylate or acrylate, such as N,N-dimethylaminoethyl methacrylate, acrylonitrile, methacrylonitrile, and the like.

2. Monomers which behave under conditions of the precipitation polymerization in a different way, i.e. their polymers either dissolve or become greatly swelled in the diluting agent used. Herein are included, but not limited the following compounds: alkyl methacrylates or alkyl acrylates, such as butyl methacrylate, ethyl acrylate, alkoxyalkyl methacrylates or acrylates, such as methoxyethyl methacrylate; styrene, vinyl acetate; anhydrides of unsaturated acids, such as maleic anhydride, and the like.

Figure 3:
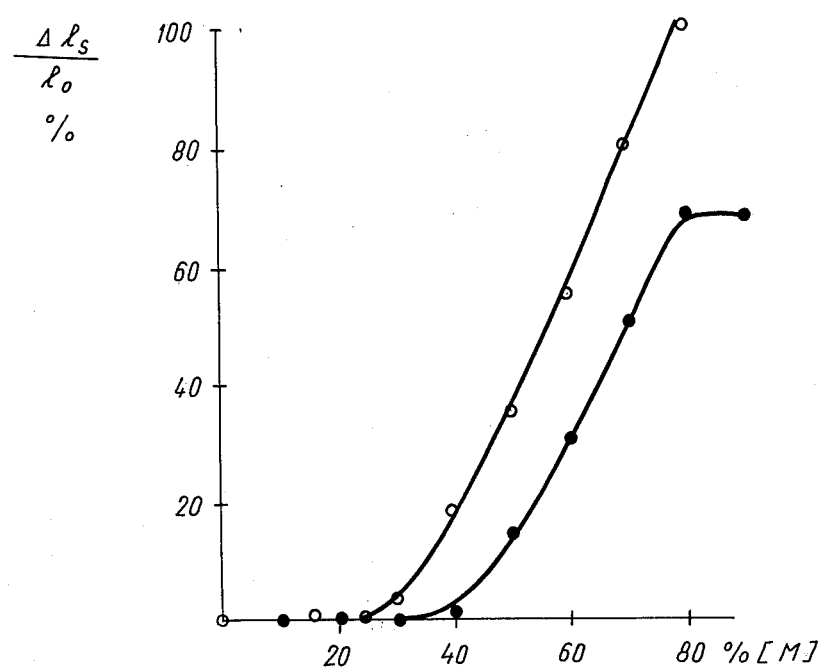
FIG. 3 is a graph showing the result of polymerization in percent swelling of swellable polymer with the use of certain monomers in varying proportions (M) with the total percent by weight of the mixture.

While the comonomers of the first group can be used in any desired propertions, the comonomers of the second group are limited to up to about 40% by weight, based on a mixture of all monomers used. Otherwise the polymer formed either becomes greatly swelled or does not even precipitate out with the diluting agent used (see FIG. 3).

In preparing hydrophlic gels reinforced with the copolymers made according to the invention (active fillers) a copolymer having the same composition as has the starting monomer mixture for preparing the gel, can be used to advantage.

As diluting-precipitating agents according to the invention, such liquids which unlimitedly dissolve all components of a monomer mixture, but neither dissolve nor substantially swell the polymer product formed, can be used. Preferably the agents are aromatic or partly hydroaromatic hydrocarbons. Examples of suitable diluting-precipitating agents are aromatic hydrocarbons, such as benzene, toluene, o-xylene, m-xylene, p-xylene and/or their mixture, ethyl benzene, cumene, P-cumene, and the alike; hydroaromatic hydrocarbons, such as tetraline; halogenic derivates of aromatic hydrocarbons, such as chlorobenzene, o-chlorotoluene, benzyl chloride, and the like; halogenic derivates of aliphatic or cycloaliphatic hydrocarbons, especially chlorinated, fluorinated, and/or fluor-chlorinated hydrocarbons, such as methylene chloride, chloroform, tetrachloromethane, ethylene dichloride, trichloroethylene, trichloro-trifluoro ethane (freon 113), and the like; esters of carbonic acids and aliphatic alcohols, such as ethyl acetate, n-butyl acetate, isoamylacetate, and the like; esters of carbonic acids of aromatic hydrocarbons, such as di-n-butyl phthalate in both instances, di-iso-octyl phtalate, and the like; ethers and cycloethers, such as diethylene glycol dimethyl ether, triethylene glycol dimethyl ether, di-n-butyl ether, di-iso-propyl ether, dioxane, tetrahydrofurane; ketones and cycloketones, such as acetone, methyl-ethyl ketone, cyclohexanone, and the like.

The diluting-precipitating agents can be used either alone or in mixtures with aliphatic hydrocarbons, in amounts from 0 to 50% by volume based on the mixture of diluting agents or solvents, such as petrol ether, hexane, petrols, and the like; as well as mixtures with fully hydroaromatic hydrocarbons, such as cyclohexane, and the like.

Each of the diluting-precipitating agent in a different manner affects the course of the precipitation polymerization or copolymerization of glycol monomethacrylates or glycol monoacrylates, in the presence of the corresponding cross-linking comonomers, and the resultant portion or soluble polymer or copolymer in the product is thus varied. The effect of various diluting-precipitating agents on the amount of the soluble parts is illustrated in the examples given in Table 1. In each case the precipitation polymerization of ethylene glycol monomethacrylate (having 1 wt.-% of ethylene glycol dimethacrylate), was conducted in the presence of the given diluting-precipitating agent. The monomer comprised 10% by volume, and the given diluting agent 90% by volume. 0.25 wt.-% of dibenzoyl peroxide as an initiator of free-radical polymerization was used, based on the weight of the monomer. The polymerization was carried out under an inert atmosphere of carbon dioxide, at the temperature of 70° C for 3 hrs. 100% of conversion was achieved in each instance. The soluble portion was thereafter obtained by 20 hrs. extraction of the polymer product with methanol in a Soxhlet's extractor, and the precipitation of the polymer solution obtained with an excess of diethyl ether. The resultant products were all suitable for prosthetic devices, implant organs and devices, dentures, lenses, medicinal and pharmaceutical carriers, such as bandages, implant sponges and the like.

TABLE I

| Diluting-precipitating agent Examples 1 - 15 | wt.-% of soluble polymer in the polymer product |
|---|---|
| methylene chloride | 1.27 |
| chloroform | 9.80 |
| bromoform | 76.3 |
| trichloroethylene | 5.78 |
| glycol diacetate | 3.70 |
| methyl acetate | 2.26 |
| ethyl acetate | 6.15 |
| n-butyl acetate | 10.75 |
| benzene | 6.50 |
| toluene | 13.3 |
| p-xylene | 6.70 |
| acetone | 1.95 |
| cyclohexanone | 5.15 |
| di-n-butyl ether | 6.55 |
| dioxane | 43.5 |

The effect of the concentration of cross-linking agent (ethylene glycol dimethacrylate) with a constant dilution of the polymerization mixture, i.e. 90% by volume, on the portion of the soluble polymer in the polymer product obtained by precipitation polymerization under the same conditions as in the legend to Tabl. I, for chloroform (1), and di-n-butyl ether (2), is presented graphically in the FIG. 2. The higher quantity of the soluble polymer in the case of chloroform is as a consequence of the larger chain transfer onto the solvent (cf. also with extreme bromoform in Tab. I). From this relationship, the effect of the cross-linking comonomer on a course of precipitating polymerization is quite evident. Slight amounts of cross-linking agent steeply decrease the portion of soluble polymer in the resulting polymer product. With about 0.2% by volume, based on the total starting polymerization mixture, the portion of the soluble polymer is not far from zero. From this it is clear that the limiting concentration of cross-linking agent, in the whole polymerization mixture, lies in the range of 0.02 to about 0.2% by volume, without regard to the amount of monoester of glycol methacrylate or glycol acrylate, or other non-cross-linking comonomer.

The production of polymers or copolymers according to the present invention can be performed practically either in a discontinuous or batch manner or in a continuous manner for a large production. According to the discontinuous manner the method proceeds with individual batches in a device which is very simple, and consists of these basic parts: a polymerization reactor (a duplicator) provided with an indirect heating, preferably up to 100° C, and having a cover provided with a reflux condenser, a check-up thermometer, a charging inlet (also through a condenser) for starting raw materials, and an outlet placed at the bottom of the polymerization reactor. An inlet for inert gas is preferably provided through a reflux condenser. Stirring is not necessary in this production method, but on the contrary it is best to avoid its use for better sedimentation of the polymer product and its fall out in the course of polymerization, the formation of solid discrete particles. After termination of the polymerization process the polymer product is separated out of the diluting-precipitating agent used, simply by either filtration or centrifugation. Any remainder of diluting agent may be removed by drying, preferably under vacuum. The drying temperature should not exceed about 80° C, otherwise at the higher temperature an agglomeration of polymer particles into bigger bits (lumps) could take place. The quantity of the soluble product may also be decreased by its additional cross-linking through unsaturated groups which are to some extent present in the polymer chains (e.g. pendent vinyl groups) from the partly utilized cross-linking agents.

As an initiator for the free-radical polymerization according to the invention the customary and conventional ones can be used, which afford sufficient quantity of free radicals able to initiate, at an adequate rate, the monomers used, within temperatures preferably from 20 to 100° C. Examples of suitable initiators are the organic peroxides, azo-compounds and the like such as dibenzoyl peroxide, tert.butyl peroctoate, di-iso-propyl percarbonate, cumene hydroperoxide, azo-bis-isobutyro nitrile, and the like.

Polymer products in the form of fine powder, which composition can be varied according to the desired use or application, are prepared according to the invention by extremely fast techniques at relatively low production costs. In addition, the polymer product has an unusual character, i.e. if used in the starting mixture, for preparing of hydrophilic gels, it acts simultaneously as a thickening agent and a significant active filler as well. This makes possible the preparation of mechanically strong gels with extended life, even if used in practice in extreme conditions.

The method according to the invention is also employed by merely changing the charging speed of the monomer mixture with a given content of cross-linking agent to produce powder-like mixtures containing both soluble hydrophilic polymers in an optional ratio, e.g. within a range from 10 to 90% by weight of the soluble polymer. The mixture obtained may be further mixed with solvent which together with the soluble polymer gives a viscous solution, in which the insoluble particles (microgels) of the cross-linked polymer are dispersed and/or suspended. On addition of a further monomer, with a content of cross-linking agent above 0.2 wt.-%, together with an initiator of free-radical polymerization, the mixture can be polymerized to the form of sparingly cross-linked gel, which has excellent mechanical properties reinforcing the effect of the cross-linked polymer which there acts as an active filler.

Some further examples of the production manner according to the invention follow as examples. They are by no means a complete catalogue of examples, and do not limit the possibility of preparing other polymer products.

EXAMPLE 16

40 grams of 2-hydroxyethyl methacrylate (with 0.17% by weight of its corresponding diester) was weighed out into a ground glass flask of 250 cc, and 160 cc. of tetrachloromethane was added, in which 0.1 gram of dibenzoyl peroxide was first dissolved. The thus comprised polymerization mixture was polymerized at the boiling point of the solvent used (i.e. 78° C) for 2 hrs. under the reflux condenser, and in an inert atmosphere of pure nitrogen. At the end of the polymerization process the polymer product, which fell out of the polymerization mixture in the form of fine white powder, was caught on a sintered glass filter, washed with a small amount of pure tetrachloromethane (10 cc.), and dried at room temperature under vacuum. 38.5 grs. of fine powder-like polymer were thus obtained, which contained about 45% by weight of a soluble part (soluble in methanol). The rest comprised cross-linked polymer particles having a size of 1 - 1.5 μ. Final separation of the microgels was performed by using a dense paper filter of the type usually serving for BaSO₄ precipitate. The particles were capable of being used subsequently as gels or otherwise as biological implants, therapeutic and similar devices of the types heretofore described.

EXAMPLE 17

45 cc. of methylene chloride as diluent/precipitant were measured out into a glass ampule of 60 cc. volume, and 5.0 grs. of monomer mixture were added to it. The composition of the monomer mixture was as follows: 3 parts of 2-hydroxyethyl methacrylate (with 0.32 wt.% of its diester, and 2 parts of diethylene glycol monomethacrylate (with 0.43 wt.-% of its diester. To this monomer mixture 0.0250 grs. of azo-bis-isobutyro nitrile as an initiator of the polymerization was dissolved in the mixture, and the polymerization was then performed at the temperature of 60° C for 3 hrs. under an inert atmosphere of nitrogen. The precipitant polymer product was dried at room temperature under vacuum and 4.9 grs. of fine powder-like copolymer were thus obtained, which contained about 27 wt.% of the soluble part (in methanol).

EXAMPLE 18

The procedure according to Example 16 was followed, but di-n-butyl ether as the diluting-precipitating agent was used under similar conditions, and a polymer product having 17 wt.-% of the soluble part was thus obtained.

EXAMPLE 19

The procedure according to Example 17 was followed. 10 grs. of a monomer mixture having a composition as follows: 5 parts of 2-hydroxyethyl methacrylate (with 0.32 wt.% of diester), 4 parts of butyl methacrylate, and 1 part of methacrylic acid were used as the charge. 0.050 gr. of cumene hydroperoxide was used as an initiator of the polymerization (0.5 wt.-% based on the monomer mixture), and the polymerization was carried out with the given diluent/precipitant at the temperature of 80° C for 2 and ½ hours. 9.3 grs. of the polymer product (the copolymer) containing about 50 wt.-% of a soluble polymer (in methanol) were thus obtained.

EXAMPLE 20

The method according to Example 16 was followed and the polymer product obtained. The method was then extended so that this product was further worked by the the following manner: 1 part of the polymer product was mixed together with 1 part of diacetin (a mixture of 1,2 and 1,3 isomers), and with 2 parts of 2-hydroxyethyl methacrylate monomer (with 0.32 wt.-% of diester), and 0.22 part of dibenzoyl peroxide. The mixture was stirred thoroughly, and a very thick paste was thus formed which after further polymerization was spread onto a hard base of polymethyl methacrylate providing it with a firm hydrophilous gel (the polymerization at 80° C for 1 hr.) The gel layer was firmly combined and chemically bonded with the said hard base oven under conditions of the equilibrium swelling in water. Such a procedure can be practically used to advantage for providing hard acrylic dentures with a soft hydrophilic gel layer according to the invention of Czech. Pat. No. 138,197.

EXAMPLE 21

In another example following the procedure of Example 20, three dimensional polymerization of the subsequent mixture was carried out in a mold conforming to the denture.

The same examples as those given above may be duplicated in similar examples using a continuous process such as that suggested in the copending application, by charging the monomer mixture with the cross-linking agent in small quantities, while being stirred, with the diluent/precipitant at a rate sufficient to maintain the concentration thereof in the critical limits, preferably equal to the rate at which the resultant products fall out of the solution.

What is claimed is:

1. The method of producing hydrophilic polymer products comprising a mixture of both soluble and insoluble components which comprises forming a starting monomer mixture consisting essentially of (1) a major portion of monoesters of methacrylic and/or acrylic acids and polyvalent alcohols selected from the group consisting of ethylene glycol, diethylene glycol, triethylene glycol, 1,2-propylene glycol, 1,4-butylene glycol, glycerol, pentaerythritol, mannitol and sorbitol, and (2) a minor amount of a crosslinking agent selected from the group consisting of di- and triesters of methacrylic and/or acrylic acid and polyvalent alcohols selected from the group consisting of ethylene glycol, diethylene glycol, triethylene glycol, 1,2-propylene glycol, 1,4-butylene glycol, glycerol, pentaerythritol, mannitol and sorbitol; combining said starting monomer mixture with (3) a member selected from the group consisting of monocyclic and bicyclic aromatic and partly hydrogenated monocyclic and bicyclic aromatic hydrocarbons, halogenated aliphatic and cycloaliphatic hydrocarbons, esters of carboxylic acids and aliphatic and aromatic alcohols, ethers, cycloethers, ketones and cycloketones, said last mentioned group member being capable of unlimitedly dissolving all of the monomer components but being a nonsolvent and/or swelling agent for the polymer product, said monomer being present in an amount of less than 66% by weight of the total polymerization mixture including said last mentioned group member; polymerizing said monomer mixture under conditions of free radical polymerization to form a polymeric product which is in part soluble and in part insoluble in a member selected from the group consisting of lower aliphatic alcohols, dimethylformamide, glycol methacrylate and glycol acrylate; and effecting the combination of the monomer mixture with the group (3) member during such polymerization in small quantities under controlled stirring at a rate at which the polymeric product formed separates out of the polymerization solution and at which the concentration of the crosslinking agent is maintained within the critical range of 0.02 to 0.2% by volume based on the total volume of the polymerization mixture.

2. The method according to claim 1 wherein said monomer group member (1) is introduced at a rate adapted to the amount of crosslinking agent and is held above a limit where crosslinked polymer is formed but under a limit where the content of said crosslinked polymer exceeds 90 wt.% of the polymer product.

3. The method according to claim 1 wherein said polymer product has a grain size of about 1 μ.

4. The method according to claim 1 wherein said monomer (1) is in part replaced by a monomer selected from the group consisting of acrylamide, methacrylamide, acrylic-, methacrylic-, itaconic-, citraconic-, maleic- and fumaric-acids, N-vinyl pyrrolidone, 2-aminoethylmethacrylate, N-methylaminoethylacrylate, N,N-dimethylaminoethylmethacrylate, acrylonitrile and methacrylonitrile.

5. The method according to claim 1 wherein monomer (1) is in part replaced by up to about 40% by weight of a monomer selected from the group consisting of alkylacrylates and methacrylates, alkoxyalkylacrylates and methacrylates, styrene, vinyl acetate and maleic anhydride.

6. The method according to claim 1 wherein group member (3) is selected from the group consisting of benzene, toluene, xylene isomers and mixtures thereof, ethylbenzene, cumene, tetraline, chlorobenzene, 2-chlorotoluene, benzyl chloride, methylene chloride, chloroform, bromoform, tetrachloromethane, ethylene dichloride, trichloroethylene, trichlorotrifluoroethane, ethyl acetate, butyl acetate, isoamyl acetate, di-n-butylphthalate, di-iso-octylphthalate, diethylene glycol dimethyl ether, tri-ethylene glycol dimethyl ether, di-n-butyl ether, di-isopropyl ether, dioxane, tetrahydrofurane, acetone, methylethyl ketone and cyclohexanone.

7. The method according to claim 1 wherein said group member (3) is admixed with up to about 50% by volume of a member selected from the group consisting of petroleum ether, hexane and cyclohexane.

8. The method according to claim 1 wherein said polymer product is separated from any excess of said group member (3) by drying at a temperature below about 80° C.

9. The method according to claim 1 wherein said polymerization is carried out at a temperature of about 20 to about 100° C.

10. The method according to claim 1 carried out continuously comprising charging monomer (1) with crosslinking agent (2) and group member (3) at a rate sufficient to maintain said concentration of said group member constant.

* * * * *